United States Patent
Semama et al.

(10) Patent No.: US 10,182,375 B2
(45) Date of Patent: Jan. 15, 2019

(54) SYSTEM AND METHOD FOR GLOBAL LOCATION REGISTER (GLR) FOR LTE/4G MOBILE NETWORK

(71) Applicant: StarHome Mach GmbH, Zurich (CH)

(72) Inventors: Michael Semama, Doar-Na Efraim (IL); Ido David, Hod-HaSharon (IL)

(73) Assignee: StarHome Mach GmbH, Zurich (CH)

( * ) Notice: Subject to any disclaimer, the term of this patent is extended or adjusted under 35 U.S.C. 154(b) by 72 days.

(21) Appl. No.: 15/344,612

(22) Filed: Nov. 7, 2016

(65) Prior Publication Data
US 2017/0134929 A1 May 11, 2017

Related U.S. Application Data

(60) Provisional application No. 62/251,140, filed on Nov. 5, 2015.

(51) Int. Cl.
*H04W 36/00* (2009.01)
*H04W 8/12* (2009.01)

(52) U.S. Cl.
CPC ......... *H04W 36/0022* (2013.01); *H04W 8/12* (2013.01)

(58) Field of Classification Search
None
See application file for complete search history.

(56) References Cited

U.S. PATENT DOCUMENTS

| | | | | |
|---|---|---|---|---|
| 7,489,672 B2* | 2/2009 | Chitrapu | ............. | H04L 12/5692 370/342 |
| 7,577,432 B2* | 8/2009 | Della-Torre | ............ | H04W 8/02 455/432.1 |
| 7,945,262 B2* | 5/2011 | Elkarat | .................. | H04W 8/06 455/433 |
| 9,294,967 B2* | 3/2016 | Sridhar | ............ | H04W 36/0022 |
| 9,392,497 B2* | 7/2016 | Kaufman | .......... | H04W 36/0022 |
| 9,749,904 B1* | 8/2017 | Zhang | ............... | H04W 36/0022 |
| 2002/0061746 A1* | 5/2002 | Jo | .......................... | H04W 8/12 455/433 |
| 2006/0246897 A1* | 11/2006 | Jiang | ...................... | H04W 8/06 455/435.1 |
| 2007/0173252 A1* | 7/2007 | Jiang | ...................... | H04W 8/04 455/432.1 |
| 2008/0125116 A1* | 5/2008 | Jiang | ...................... | H04W 8/06 455/433 |
| 2008/0125117 A1* | 5/2008 | Jiang | ...................... | H04W 8/12 455/433 |
| 2010/0285797 A1* | 11/2010 | Ghai | ................... | H04W 36/385 455/426.1 |

(Continued)

*Primary Examiner* — Matthew C Sams (57) ABSTRACT

A method of managing voice calls in LTE/4G telephony for a mobile handset roaming outside of its home network in a network where voice calls use 3G technology, using a Global Location Register (GLR) which is designed to manage registrations without informing the home network. The method involves registering the mobile handset in 4G at the roaming network, obtaining and prestoring 3G information for the mobile handset from the home network while the mobile handset is registered in 4G, obtaining a voice call request for the mobile handset; and reregistering the mobile handset in 3G at the roaming network to use circuit switch fallback for the voice call, the reregistering comprising using the prestored 3G information so that the home network does not have to be contacted.

15 Claims, 8 Drawing Sheets

(56) References Cited

U.S. PATENT DOCUMENTS

| | | | |
|---|---|---|---|
| 2011/0217979 A1* | 9/2011 | Nas | H04W 4/00 |
| | | | 455/433 |
| 2011/0280254 A1* | 11/2011 | Shi | H04W 8/02 |
| | | | 370/401 |
| 2012/0099573 A1* | 4/2012 | Jalkanen | H04W 4/001 |
| | | | 370/338 |
| 2012/0142341 A1* | 6/2012 | Nagpal | H04W 48/18 |
| | | | 455/426.1 |
| 2012/0222091 A1* | 8/2012 | Castellanos Zamora | H04L 63/08 |
| | | | 726/3 |
| 2012/0302234 A1* | 11/2012 | Wallis | H04W 36/0022 |
| | | | 455/433 |
| 2013/0237213 A1* | 9/2013 | Tian | H04W 36/0022 |
| | | | 455/432.1 |
| 2013/0259001 A1* | 10/2013 | Keller | H04W 76/18 |
| | | | 370/331 |
| 2015/0031357 A1* | 1/2015 | Kaufman | H04W 36/0022 |
| | | | 455/433 |
| 2015/0098391 A1* | 4/2015 | Sridhar | H04W 36/0022 |
| | | | 370/329 |
| 2015/0229491 A1* | 8/2015 | Solovyev | H04L 12/66 |
| | | | 370/328 |
| 2015/0257043 A1* | 9/2015 | Wallis | H04W 36/0022 |
| | | | 455/436 |
| 2016/0337845 A1* | 11/2016 | Noldus | H04W 8/06 |

* cited by examiner

SYSTEM AND METHOD FOR GLOBAL LOCATION REGISTER (GLR) FOR LTE/4G MOBILE NETWORK

RELATED APPLICATIONS

This application claims the benefit of priority under 35 USC § 119(e) of U.S. Provisional Patent Application No. 62/251,140 filed on Nov. 5, 2015, the contents of which are incorporated herein by reference in their entirety.

FIELD AND BACKGROUND OF THE INVENTION

The present invention, in some embodiments thereof, relates to a global location register for LTE/4G, and, more particularly, but not exclusively, to a way of using the global location register in a network that requires 3G for voice calls, the global location register being expected to mobile handset manage the passage of the mobile handset between 4G and 3G without notifying the home network.

The GLR (Global Location Register) has been standardized by 3GPP/ETSI for the GSM/3G network. The GLR is a core network component, connected between the VLRs and the HLR and typically located in the mobile network. The GLR receives the Update Location registration attempts from the VLRs, but does not necessarily relay these signals to the HLR at the home network. Instead, the GLR records the real VLR address, and sends a confirmation to the VLR as if it is the HLR. The HLR remains unaware that this registration has taken place at all, since the HLR assumes the subscriber is registered in the GLR. This is because, at the initial roaming registration the GLR provided its address to the HLR as the serving VLR. From now on, the GLR does not have to provide additional updates to the HLR. The GLR in the 3G world continues to emulate the VLR to the HLR, and in the other direction emulates the HLR to the VLR.

The GLR component was designed in order to save signaling traffic between the VLRs and the HLR, and is found useful in roaming scenarios, where the VLRs are in the roaming network and the HLR in the home network. In that case, the international signaling traffic may be reduced dramatically. The GLR is also used for anti-steering of roaming, preventing the home network from steering away the subscriber from the visited network to other networks that the home network may prefer. Steering is possible whenever a registration attempt reaches the home network. Minimizing these events may minimize opportunities for steering of roaming away from the current visited network by the home network.

The GLR has not been standardized for LTE/4G networks, which differ from the 3G networks in that they use the Diameter protocol, in place of the MAP used by 2G/3G case. Furthermore, attempting to use a GLR in the 4G environment runs up against a problem.

Voice communication in 4G is supposed to use Voice over IP (VoIP) for actual mobile handset calls but many 4G networks retain the standard circuit switching methodology used by 3G and 2G for voice calls, and thus when voice calls are required, a protocol called circuit switch fall back (CSFB) is used and the mobile handset temporarily re-registers as a 3G mobile handset for the duration of the call, and subsequently returns to the 4G registration. But the 3G and 4G registrations are mutually incompatible and use different infrastructure, and the location registers find that they do not have the necessary information for changing between the 3G and 4G protocols and infrastructure without involving the home network. Thus the GLR is unable to perform its task.

SUMMARY OF THE INVENTION

The present embodiments relate to a way of carrying out CSFB and subsequently returning to the 4G state without alerting the home network that any new registration has occurred. In embodiments this is achieved by obtaining necessary information in advance, for example through phantom 3G registrations, such as phantom registrations for 3G data exchange or GPRS. The phantom registrations obtain profile data which is then stored at the visited network, for example at the GLR, and can be used to fulfil subsequent registration requests.

According to an aspect of some embodiments of the present invention there is provided a method of managing voice calls for a mobile handset having a home network and roaming outside of the home network in a visited network, both the home network and the visited network being 4G/LTE networks wherein voice calls use 3G technology, the managing to be carried out at the visited network without informing the home network, the method comprising:

registering the mobile handset in 4G at the roaming network;

obtaining and prestoring 3G information for the mobile handset from the home network while the mobile handset is registered in 4G;

obtaining a request for a 3G registration initiated by a Circuit-Switch-Fallback process following a voice call associated with mobile handset; and reregistering the mobile handset in 3G at the roaming network to use circuit switch fallback for the voice call, the reregistering comprising using the prestored 3G information, thereby carrying out the reregistering, without notifying the reregistration to the home network.

In an embodiment, the obtaining a profile comprises using a fictive GPRS registration to obtain a GPRS profile.

In an embodiment, the preobtained information comprises a 3G data profile for using as a reply to an SGSN for registering with the SGSN.

In an embodiment, the reregistering comprises registering for 3G data communication with an SGSN.

An embodiment may comprise storing 4G data of the mobile handset prior to the voice call.

An embodiment may comprise reregistering the mobile handset in 4G following completion of the voice call, the reregistering comprising using the stored 4G data, thereby carrying out the re-registering without notifying the home network.

In an embodiment, the stored 4G data comprises an MME profile.

In an embodiment, the 4G registration is carried out at an MME and the 3G registration is carried out at a VLR.

In an embodiment, the prestoring is carried out at a global location register (GLR).

An embodiment may comprise receiving 4G signaling from the home network during the voice call and translating the 4G signaling into 3G signaling for sending to the mobile handset.

An embodiment may comprise receiving 3G signaling from the mobile handset or from the visited network during the voice call and translating the 3G signaling into 4G signaling for sending to the home network.

An embodiment may comprise carrying out the prestoring at a global location register at the visited network and carrying out the reregistration by obtaining the prestored data from the global location register.

In an embodiment, the prestored data comprises at least one member of the group consisting of, a VLR profile, an SGSN profile and an MME profile.

According to a second aspect of the present invention there is provided a global location register for use in a first LTE/4G cellular telephony network to support roaming by 4G mobile phones, the LTE/4G networks managing voice calls using 3G technology, the global location register managing the roaming devices without informing the home network after initial registration, the global location register comprising:

a management unit for managing the calls by interception of signaling between the first network and a home network of a respective mobile handset; and a storage containing profile data of the mobile handset, the global location register being configured to use the profile data to complete subsequent reregistrations of the mobile handset without informing the respective home network.

In an embodiment, the profile data is a VLR profile.

In an embodiment, the profile data comprises an SGSN profile for registration for GPRS.

In an embodiment, the profile data is an MME profile for registration back to an MME.

An embodiment may comprise a Diameter—MAP translation unit for translation between Diameter and MAP signaling for the mobile handset when registered in 3G but believed to be registered in 4G by the home network.

According to a third aspect of the present invention there is provided a method of registering a mobile handset in an LTE/4G network wherein the voice calls use 3G, comprising:

prestoring in the network a 3G profile for a mobile handset as part of a 4G registration procedure;

receiving a voice call for the mobile handset registered using the 4G registration procedure;

retrieving the prestored 3G profile for the mobile handset; and registering the mobile handset in a 3G registration procedure using the retrieved 3G profile.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions.

Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL
VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS
OF THE INVENTION

The present invention, in some embodiments thereof, relates to a global location register for LTE/4G, and, more particularly, but not exclusively, to a way of using a global location register in a 4G network that uses 3G for voice calls and thus mobile handset switches between 4G and 3G protocols.

As mentioned in the background, in most of the LTE or 4G networks, voice calls are still managed by 3G technology, including protocol and infrastructure. When the call reaches the mobile handset, or when the mobile handset makes a call, the mobile handset switches from 4G to 3G, and may use a technology called CSFB (Circuit Switch Fall Back) in order to do so. The mobile handset manages the call, and after the call is terminated, the mobile handset switches back to 4G/LTE. The CSFB scenarios may take place not only for voice calls, but for SMSs in certain cases, and in other cases that require 3G instead of 4G.

While returning to LTE after completion of the call, the device re-registers in the LTE network, and issues a new registration attempt (Diameter ULR—Update Location request) towards the HSS at the home network. At this point, the GLR/LTE, which in the case of roaming at another (visited) network, is located at the visited network, may intercept the ULR, and may not transfer the ULR to the home network.

According to the present embodiments the GLR may use the previous ULR response (ULA), received from the HSS, and may generate a response to the requesting MME. The response contains information needed for a 4G registration and may contain the subscriber profile, but not in all cases. The GLR/LTE thus knows the real MME serving the device, while the HSS at the home network assumes it is registered at the GLR/LTE (which provided its address as the serving MME beforehand), or at another MME.

In another embodiment, the GLR may provide to the HLR the real address of the first serving MME, or a pseudo-MME address, and not necessarily the GLR address.

However, while the handset moves from LTE to 3G, it also registers in the SGSN, a 2G/3G entity, of the visited network for data control, since data control may still be required during the course of the call. The SGSN replaces the MME data control of the 4G network. In order to support the CSFB scenario, without notifying the home network, the GLR needs to have the SGSN data profile of the subscriber beforehand. When the device falls back to 3G and registers with the SGSN, the SGSN sends the Update Location GPRS (ULgprs) towards the HLR, so the GLR needs to intercept the ULgprs request, and provide the MAP ISD (Insert Subscriber Data) in response, which includes a subscriber profile, as it is would be returned from the HLR.

In the conventional case the GLR does not have the subscriber profile at this point and thus needs to contact the HLR at the home network. The protocols used by the networks may not allow any way of obtaining such a profile except through a registration attempt, but passing on the registration attempt to the home network not only needlessly increases international data traffic but also provides an opportunity for the home network to steer the roaming user to another network.

According to the present embodiments the GLR requests the data profile from the HLR during or after the device is registered to LTE in the visited network, typically as an extension of the 4G registration but in any case before any CSFB attempt and not as part of the CSFB attempt. Obtaining the profile may thus be the new functionality required by the GLR in LTE. In an embodiment the profile is obtained during a fictive, or phantom, GPRS registration, which is a registration for transfer of data under 3G.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
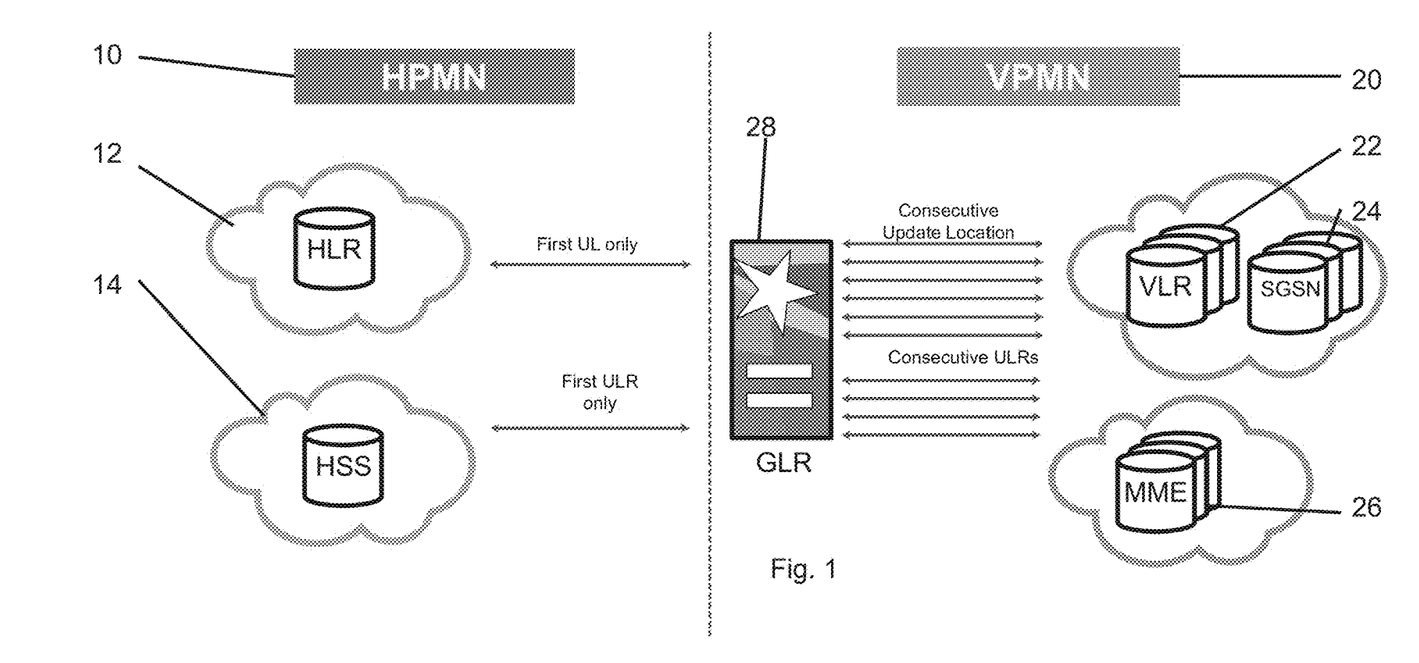
FIG. 1 is a simplified diagram illustrating elements of the 3G and 4G infrastructure used in roaming.

Referring now to the drawings, FIG. 1 illustrates the main components involved in roaming registration in 3G/4G networks. A global location register according to the present embodiments is located at a visited LTE/4G network and deals with roaming registration requests from a home network which is also an LTE/4G network. Both networks have 2G/3G infrastructure and protocols for managing calls.

Network 10 is the home network or HPMN at which a given 4G capable mobile device is registered. The home network has a home location register, HLR 12, which is 2G/3G infrastructure containing the registration information of the devices registered on the network and which tracks the current locations of the devices so that calls can be forwarded. The home subscriber server 14, or HSS, is the equivalent device for 4G and again, contains the registration information of the devices registered on the network and tracks the current locations of the devices.

Network 20 is the visited network or VPMN, at which a particular cellular mobile handset registers, typically when it finds itself at a geographical location not covered by its home network. The visited network has a visitor location register or VLR 22, which is a 2G/3G entity to which the mobile handset registers for voice calls and which would normally be the location held in the HLR 12. The serving GPRS support node or SGSN 24 registers the device for 2G/3G data transactions, which are typically carried out using the general packet radio service or GPRS.

Both networks support 4G/LTE and corresponding to home subscriber server HSS 14 at the home network, the VPMN 20 has mobile management entity MME 26, which contains the device registration for LTE/4G transactions, supports the LTE/4G transactions and provides an address which is typically stored as the current location by HSS 14.

The VPMN further comprises global location register GLR 28. The task of the global location register is to relay registration once to the home network infrastructure and provide a single address with which the home network communicates as the serving MME. The GLR registers the roaming device and keeps a record of the current location of the roaming device so that all incoming communication from the home network can be forwarded accordingly, without the home network having to be informed each time the location changes.

As mentioned, 3G and 4G use separate registrations and thus the GLR is required to support change of registration between 3G and 4G whenever voice calls begin or are completed.

Figure 2:
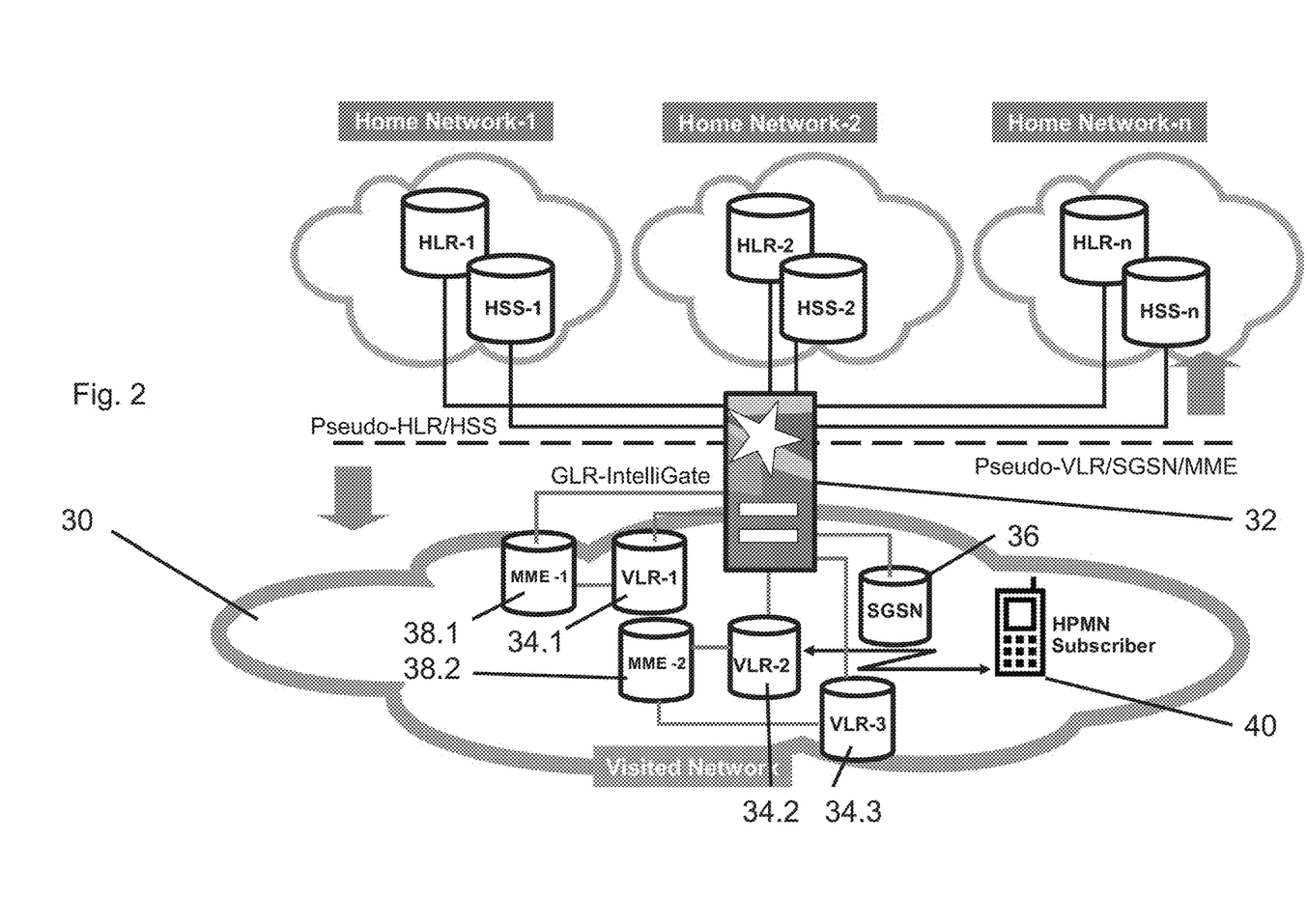
FIG. 2 is a more detailed diagram showing a possible layout of the infrastructure in the visited network and how the visited network faces numerous home networks.

Reference is now made to FIG. 2, which is a simplified block diagram showing an exemplary distribution of components identified in FIG. 1 in a possible roaming registration scenario. VPMN 30 comprises a GLR 32 and three VLRs, 34.1, 34.2 and 34.3. A single SGSN 36 is provided for GPRS communication. MMEs 38.1 and 38.2 are provided, which do not exactly correspond to the VLRs. Subscriber 40 moves around network 30 and registers and re-registers with the different entities therein, and receives or initiates voice calls under 3G, being registered as a 4G user at other times. The GLR 32 is connected to any number of home networks, home network 1, home network 2 . . . home network n, each having both an HLR and an HSS.

Figure 3:
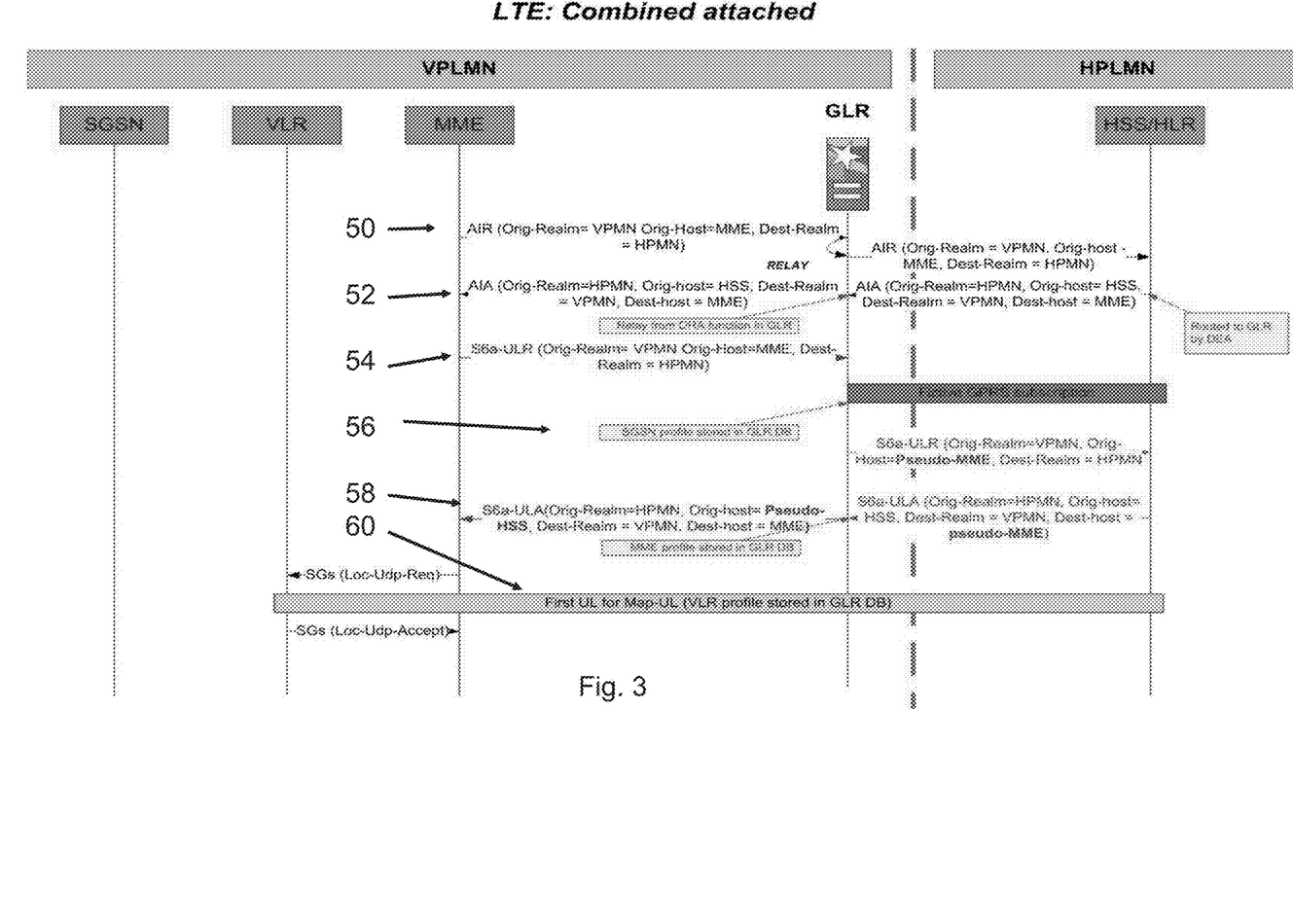
FIG. 3 is a simplified signal flow diagram showing initial 4G registration using a GLR and modified to include a fictive GPRS subscription according to the present embodiments.

Reference is now made to FIG. 3 which is a simplified signal flow diagram showing initial registration of roaming user 40 at a visited network VPMN. The initial registration is carried out with an MME using the 4G protocol and involves the user's home network. The MME produces AIR signal 50 which is to do with authentication of the SIM card. The signal is intended for the home network. It is intercepted by the GLR but then is relayed without modifications to the home network.

At this point the MME provides an update location signal ULR 54, which is intercepted by the GLR as well. Since this is the first ULR, it will be relayed to the home network as well, but not before getting the GPRS profile for that subscriber, as explained in the following.

At this point, during or immediately after initial registration, or at least not as a part of any 3G activity on the part of the mobile handset, the GLR issues a GPRS Update Location, requesting 3G data registration for the mobile handset. The home network responds by providing an SGSN profile for the particular user. The profile may contain permissions for particular types of data use and the like, without which 3G data communication could not be allowed, and other relevant information such as destinations for particular data and personal preferences if any. The GLR then stores the profile for future use (stage 56).

In signal exchange 58, the GLR completes the relay of the ULR message, the 4G MME profile is made available and is also stored in the GLR, so as to be available after calls are completed to re-register the device with the 4G infrastructure.

Signal exchange 60 indicates the first 3G mobile handset registration made by the corresponding VLR of the visited network, which is carried via the MAP protocol and is relayed to the HPMN as well, and the VLR profile is also stored in the GLR.

Figure 4:
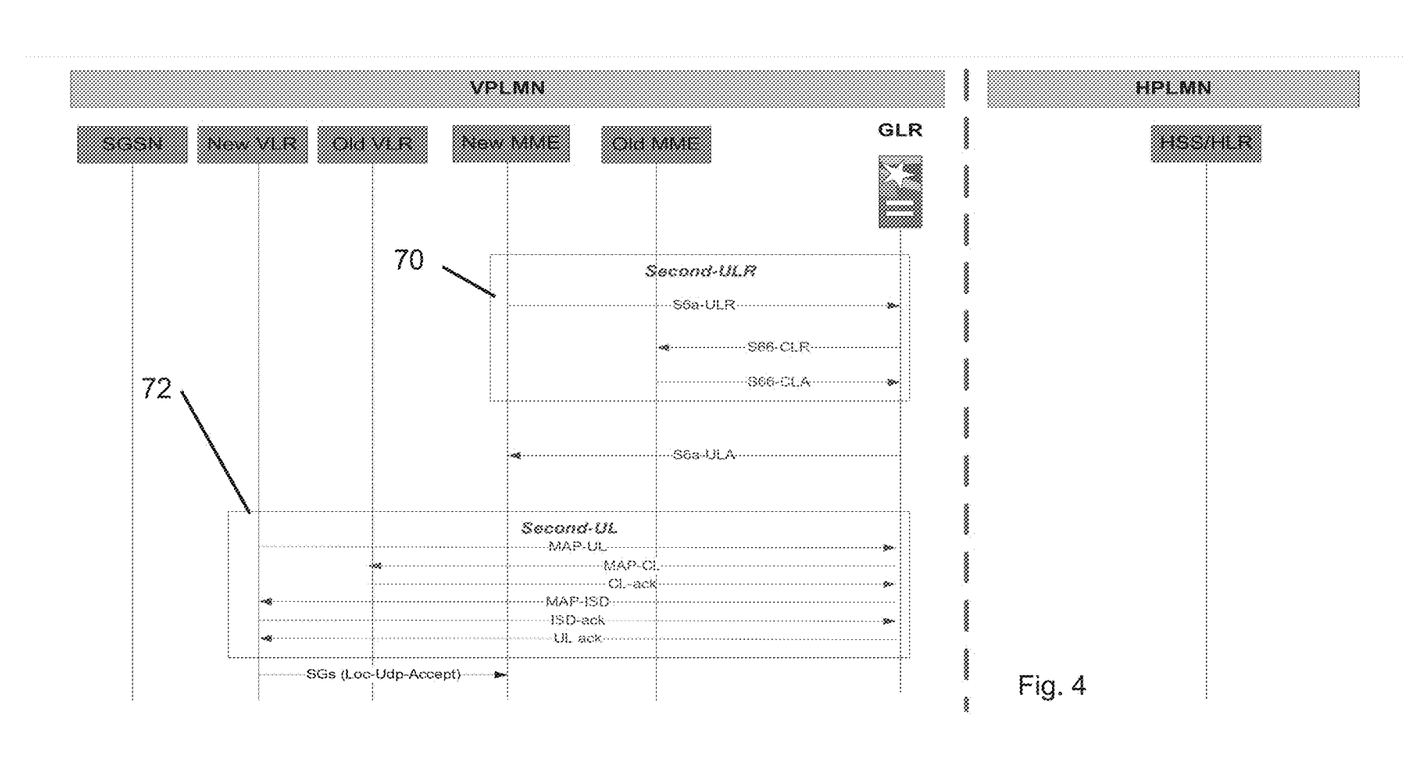
FIG. 4 is a simplified signal flow diagram showing handover between 3G and 4G network entities using a GLR according to the present embodiments.

Reference is now made to FIG. 4, which is a simplified diagram showing the operation of update registrations as the user moves between infrastructure entities on the visited network. As will be noted, the home network is not informed of any of these changes. Rather the home network constantly sees the address provided by the GLR at the initial registration. Frame 70 shows the signal exchange, using the Diameter protocol, as the mobile handset moves from a first (old) MME to a second (new) MME. The update location request or ULR, from the new MME, is intercepted by the GLR, which informs the old MME and receives its acknowledgement.

Frame 72 illustrates the signal exchange, using the MAP protocol, as the device moves from a first (old) VLR to a second (new) VLR. The MAP-UL, or update request, is intercepted by the GLR and then a series of signals are sent to inform the old VLR and then provide necessary information and acknowledgements.

Figure 5:
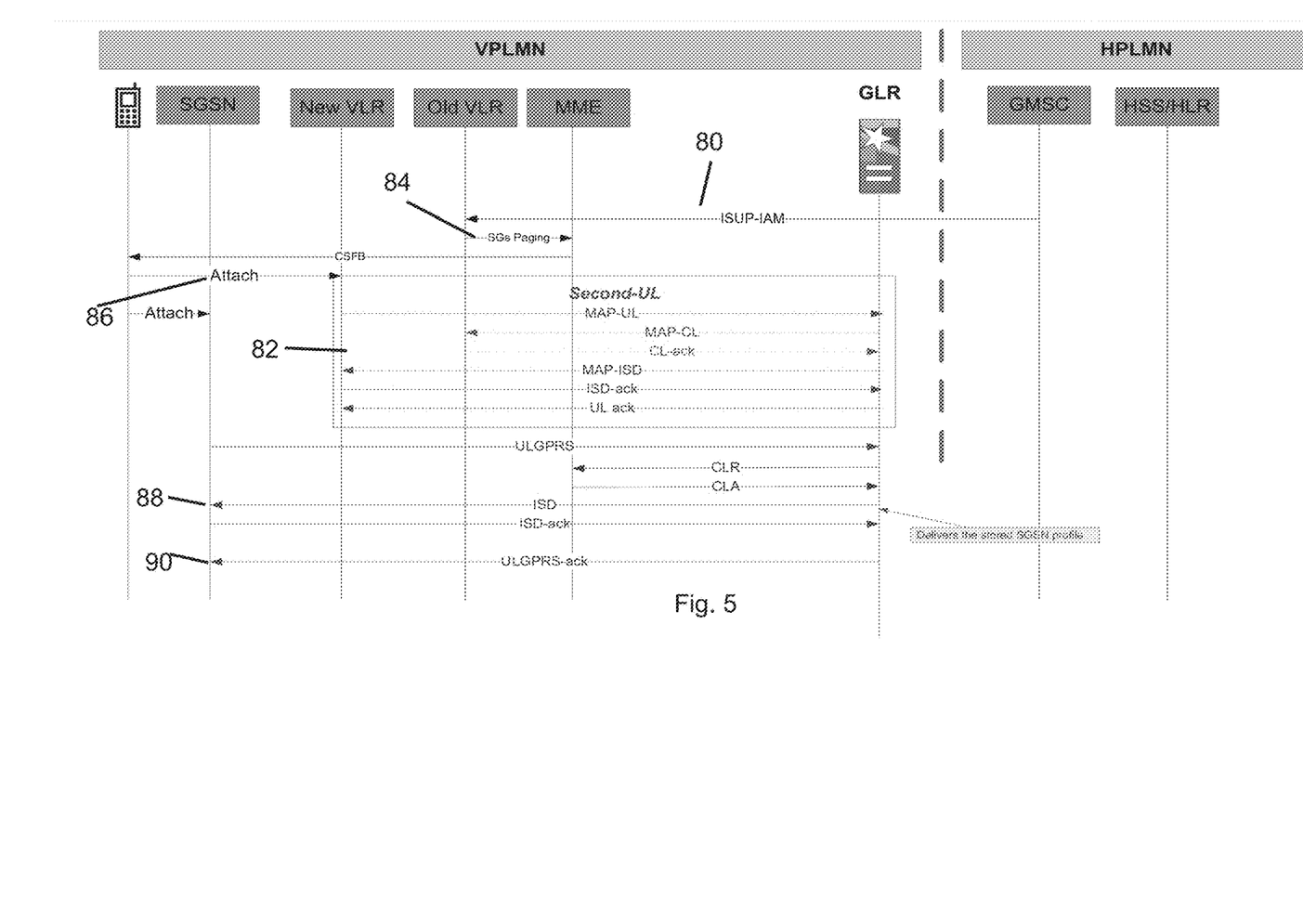
FIG. 5 is a simplified signal flow diagram showing circuit switch fallback (CSFB according to the present embodiments.

Reference is now made to FIG. 5, which is a simplified signal flow diagram illustrating the procedure when a call is initiated and the mobile handset needs to be transferred from 4G registration and infrastructure to 3G registration and infrastructure.

The call arrives—as indicted by ISUP-IAM message 80, and the network carries out circuit switching fallback or CSFB, as discussed above. The part in frame 82 relates to an issue that there is not a one-to-one correspondence between the MME and the VLR—see FIG. 2 above. During use of 4G the mobile handset may therefore move into the area of a new VLR without this being noticed. Thus the VLR registration needs to be moved from the old VLR to the new VLR as a first stage in the call setup, since the HLR automatically sends the mobile handset call to the currently registered (old) VLR.

The update of the VLR, in frame 82, may happen automatically if there is a change in MME, but not generally otherwise. In the case of automatic update the call goes initially to the correct (new) VLR.

In frame 82, the old VLR notes that it has no target for the currently incoming call, so it carries out SGs paging 84 to the MME.

The MME gets a signal from the mobile handset and sends an attach signal 86, which finds the correct VRL and connects. During this process, no messages are sent to the home network. Rather everything is managed by the GLR. Acknowledgements of the update are made and the update is carried out for both call and data in 3G. The GLR carries out the data part of the update using the SGSN profile stored during the initial registration. The data connection is then confirmed using update location UL GPRS signal 90.

Figure 6:
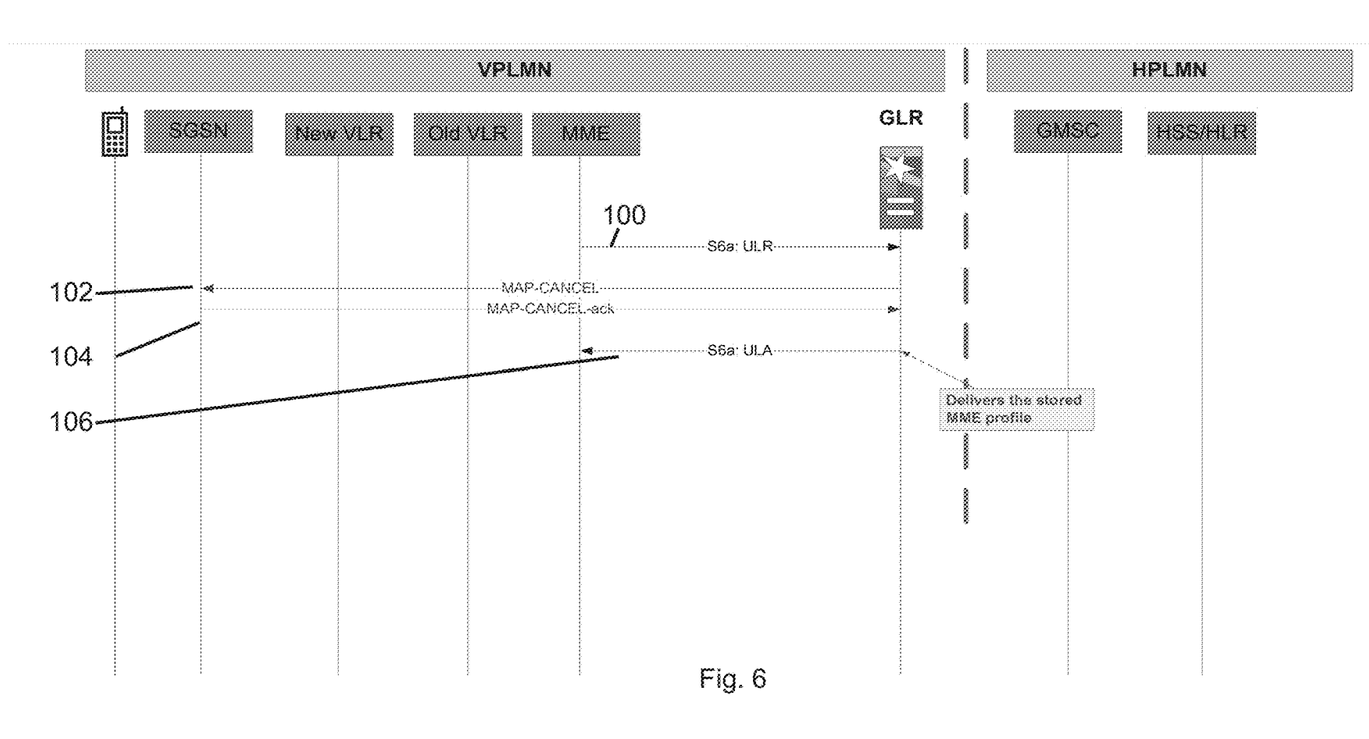
FIG. 6 is a simplified signal flow diagram showing reregistration in 4G after a voice call using a GLR according to the present embodiments.

Reference is now made to FIG. 6, which is a simplified signal flow diagram showing the return to 4G registration after the call has ended. In this final stage the location of the mobile handset is updated back to the MME 100. The location is cancelled at the 3G infrastructure, MAP Cancel 102 and acknowledgement 104 and the update location acknowledgement 106 to the MME from the GLR includes the previously stored MME profile, which was stored at the GLR (See FIG. 3 signal item 58) so that the home network does not have to be consulted again.

During the call itself, the home network is not informed of the 3G registration. Although the home network is not going to connect another call at the same time, there may be data signals to pass on, and a problem arises in that the home network believes the mobile handset to be registered in 4G when in fact it is registered in 3G. Thus the messages from the home network are sent in Diameter protocol rather than MAP protocol.

Likewise the visited network infrastructure and the mobile handset itself send everything in MAP protocol and are unaware that the home network expects Diameter. The GLR may therefore carry out conversion, during the time that the mobile handset is in the fallback state, between MAP and Diameter. Such a conversion is known in general for various purposes but is not conventionally carried out for a 4G mobile handset during a 3G voice call where knowledge of a 3G registration for the purpose of that conversation is being withheld from the home network. The signals converted may include cancel, purge and reset signals.

Figure 7:
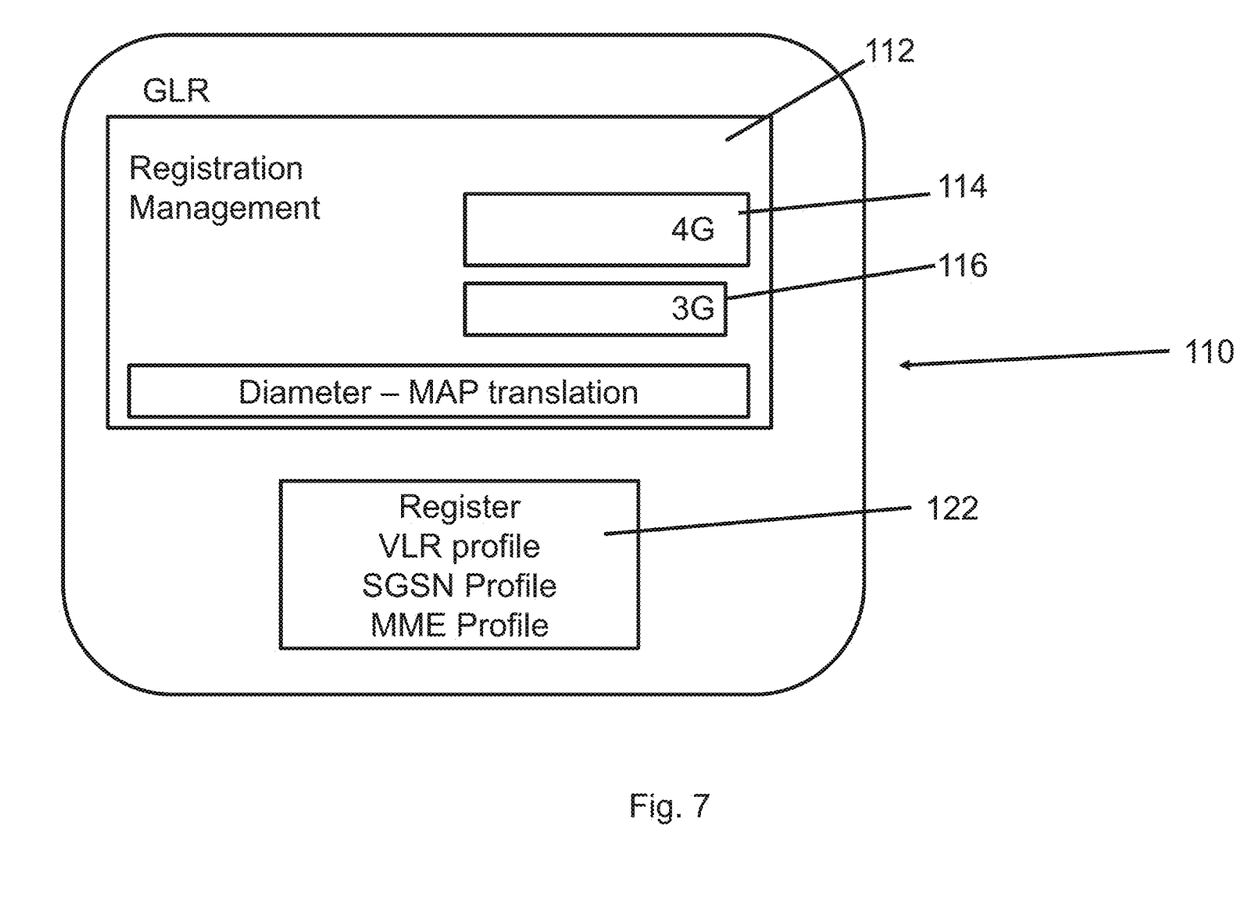
FIG. 7 is a simplified block diagram of a GLR according to the present embodiments.

Reference is now made to FIG. 7, which is a simplified diagram showing a global location register 110 for use in a first LTE/4G cellular telephony network to support roaming by 4G mobile phones. The LTE/4G networks manage voice calls using 3G technology, which includes 3G protocols and 3G infrastructure. The global location register manages the roaming devices and the idea is to carry out as much as possible of the registrations and re-registrations without informing the home network.

The global location register 110 includes a management unit 112 which manages roaming registrations, including registrations caused by mobile calls, by interception of signaling between the first network and the home network and provides the home network with a single address (per network entity) which the home network uses as the location of the serving network entity for the mobile handset.

The entities may be the 4G MME, 3G VLR and 3G SGSN. The global location register then intercepts all communication between the home network and the visited network regarding the mobile handset and manages the communication. That is to say the GLR may comprises 4G management 114 and 3G management 116 which manages SCFB.

The GLR further comprises a register 122 which stores profile data of the mobile handset. The profile data may include both 4G and 3G profiles. The data may further include VLR profile data, SGSN profile data and an MME profile. The global location register uses the profile data to complete subsequent reregistrations of the mobile handset without informing the respective home network.

The GLR 110 may further include a Diameter—MAP translation unit 124 that translates signals between the two protocols. The translation unit may be particularly useful when the mobile handset is registered in 3G for a voice call at the visited network but the home network believes that the mobile handset is registered in 4G as the GLR has not informed the home network of the reregistration. Thus the home network sends and expects to receive messages in 4G, and the mobile handset and visited network send and expect to receive messages in 3G. The matching unit ensures that both the home and visited infrastructure receive messages in the protocol that is expected even though the messages were sent in the other protocol.

Figure 8:
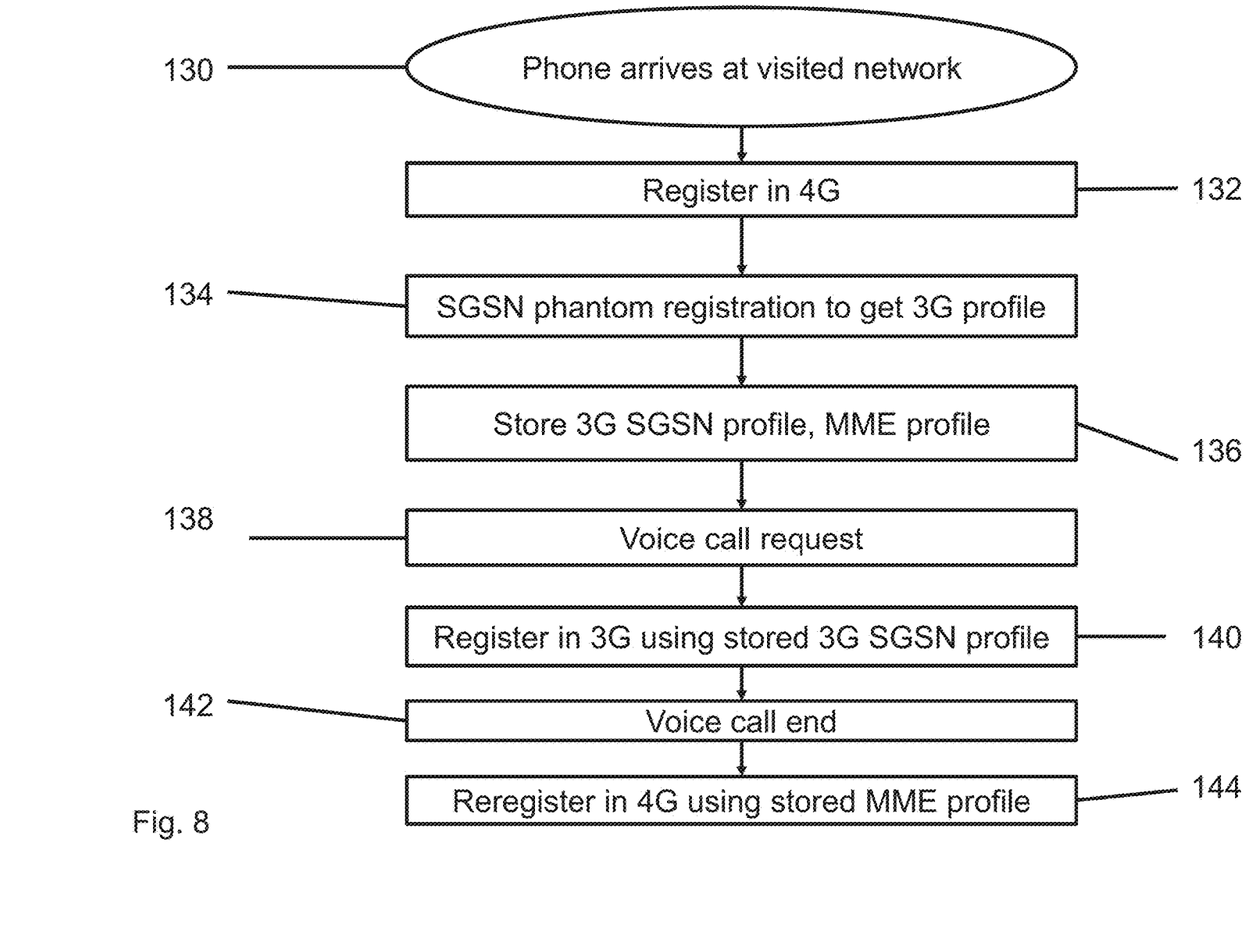
FIG. 8 is a simplified flow chart illustrating the process of registering in 4G, then reregistering in 3G for a voice call and returning to 4G according to an embodiment of the present invention.

Reference is now made to FIG. 8, which is a simplified flow chart illustrating a method of managing voice calls in LTE/4G telephony for a mobile handset roaming outside of its home network in a network where voice calls use 3G technology, as discussed above. The mobile handset arrives at the visited network 140 and is registered 142 in 4G at the roaming network using a 4G global location register such as that shown in FIG. 7.

Box 134 indicates a stage of carrying out a phantom 3G registration such as an SGSN registration to obtain a 3G profile. Box 136 indicates prestoring the 3G information, such as the SGSN profile, while the mobile handset is registered in 4G. At the same time or later the GLR may additionally register the 4G MME profile.

Box 138 indicates obtaining a voice call request either from or for the mobile handset. That is to say the call may be originated by the mobile handset or terminated at the mobile handset. Box 140 indicates reregistering the mobile handset in 3G at the roaming network using circuit switch fallback so that the mobile handset is connected to the 3G infrastructure in order for the voice call to be handled.

The reregistering may comprise using the prestored 3G information. The reregistering may involve registering for 3G data communication with an SGSN. Box 142 indicates the end of the voice call and box 144 indicates reregistering the mobile handset in 4G following completion of the voice call, the reregistering comprising using the stored 4G data, which may be an MME profile.

It is expected that during the life of a patent maturing from this application many relevant communication protocols and infrastructure generations will be developed and the scopes of the corresponding terms are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of managing voice calls for a mobile handset having a home network and roaming outside of said home network in a visited network, both said home network and said visited network being fourth generation/long term evolution (4G/LTE) networks characterized by use of Internet Protocol (IP) wherein voice calls use third generation (3G) technology, said third generation technology involving circuit switching, said managing to be carried out at said visited network without informing the home network, the method comprising:
    registering the mobile handset in 4G at the roaming network;
    obtaining and prestoring 3G information for the mobile handset from the home network while the mobile handset is registered in 4G;
    obtaining a request for a 3G registration initiated by a Circuit-Switch-Fallback process following a voice call associated with mobile handset; and
    reregistering the mobile handset in 3G at the roaming network to use circuit switch fallback for the voice call, the reregistering comprising using the prestored 3G information, thereby carrying out said reregistering, without notifying the reregistration to the home network, wherein said obtaining and prestoring said 3G information comprises using an emulated general packet radio service (GPRS) registration to obtain a GPRS profile.

2. The method of claim 1, wherein said prestored 3G information comprises a 3G data profile for using as a reply to an serving GPRS support node (SGSN) for registering with said SGSN.

3. The method of claim 2, wherein said reregistering comprises registering for 3G data communication with an SGSN.

4. The method of claim 1, further comprising storing 4G data of the mobile handset prior to said voice call.

5. The method of claim 4, further comprising reregistering the mobile handset in 4G following completion of the voice call, the reregistering comprising using said stored 4G data, thereby carrying out said re-registering without notifying said home network.

6. The method of claim 5, wherein said stored 4G data comprises an mobility management entity (MME) profile.

7. The method of claim 1, wherein said 4G registration is carried out at an MME and said 3G registration is carried out at a visitor location register (VLR).

8. The method of claim 1, wherein said prestoring is carried out at a global location register (GLR).

9. The method of claim 1, further comprising receiving 4G signaling from said home network during said voice call and translating said 4G signaling into 3G signaling for sending to said mobile handset.

10. The method of claim 1, comprising receiving 3G signaling from said mobile handset or from the visited network during said voice call and translating said 3G signaling into 4G signaling for sending to said home network.

11. The method of claim 1, comprising carrying out said prestoring at a global location register at said visited network and carrying out said reregistration by obtaining said prestored data from said global location register.

12. The method of claim 11, wherein said prestored data comprises at least one member of the group consisting of, a VLR profile, an SGSN profile and an MME profile.

13. A method of registering a mobile handset in an LTE/4G network being based on IP technology, wherein the voice calls use 3G circuit switching technology, the method comprising:

prestoring in said network a 3G profile for a mobile handset as part of a 4G registration procedure;

receiving a voice call for said mobile handset registered using said 4G registration procedure;

retrieving said prestored 3G profile for said mobile handset; and registering said mobile handset in a 3G registration procedure using said retrieved 3G profile prestoring a 4G mobility management entity (MME) profile in said network and using said 4G MME profile to reregister said mobile handset in a 4G reregistration procedure following completion of said call.

14. The method of claim 13, wherein said 3G profile comprises a VLR profile.

15. The method of claim 13, wherein said 3G profile comprises an SGSN profile.

* * * * *